(12) United States Patent
Ieiri et al.

(10) Patent No.: US 12,319,207 B2
(45) Date of Patent: Jun. 3, 2025

(54) INTERIOR MEMBER FOR VEHICLE

(71) Applicant: HONDA MOTOR CO., LTD., Tokyo (JP)

(72) Inventors: Toshiki Ieiri, Tokyo (JP); Tomoaki Ishibashi, Tokyo (JP); Naoki Takahashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 354 days.

(21) Appl. No.: 17/971,662

(22) Filed: Oct. 24, 2022

(65) Prior Publication Data

US 2023/0133552 A1 May 4, 2023

(30) Foreign Application Priority Data

Oct. 28, 2021 (JP) .................................. 2021-176663

(51) Int. Cl.
*B60R 13/00* (2006.01)
*B60R 13/02* (2006.01)

(52) U.S. Cl.
CPC ................................ *B60R 13/0237* (2013.01)

(58) Field of Classification Search
CPC ............ B60R 13/0237; B60R 13/0243; B60R 2013/0281; B60R 2013/0287; B60R 2013/0293; B60R 13/005; B60R 13/00; B60R 13/05; G09F 21/04; G09F 21/049
USPC .............................................. 296/1.08, 146.7
See application file for complete search history.

(56) References Cited

U.S. PATENT DOCUMENTS

| 9,630,537 | B2* | 4/2017 | Kajiwara | ................. B60N 2/58 |
| 2007/0046000 | A1 | 3/2007 | Sato et al. | |
| 2011/0037243 | A1* | 2/2011 | Laframboise | .......... A47C 31/00 280/730.2 |

FOREIGN PATENT DOCUMENTS

| JP | 55-006107 | 1/1980 |
| JP | 56-097114 | 8/1981 |
| JP | 10-119944 | 5/1998 |
| JP | 2000-066604 | 3/2000 |
| JP | 2002-029256 | 1/2002 |
| JP | 2002-337168 | 11/2002 |
| JP | 2007-062497 | 3/2007 |
| JP | 2008-030711 | 2/2008 |
| JP | 2008-062702 | 3/2008 |
| JP | 2010-089735 | 4/2010 |
| JP | 2010-159062 | 7/2010 |
| JP | 2013-189156 | 9/2013 |

(Continued)

OTHER PUBLICATIONS

Sergey Baygudin, Nov. 10, 2019, Installation: Guides for ISOFIX in Skoda Rapid, https://www.drive2.ru/l/545270357276230914/ (Year: 2019).*

(Continued)

*Primary Examiner* — Cassandra Davis
(74) *Attorney, Agent, or Firm* — Amin, Turocy & Watson, LLP

(57) ABSTRACT

This interior member for a vehicle is configured by causing an upper trim and a lower trim, which are vertically divided in two parts, to abut each other, a concave section having a bottom surface portion that is planar and inclined downward on an inner side in a vehicle width direction is formed in at least a part of the lower trim, and a tag is clamped by the bottom surface portion of the concave section and the upper trim.

3 Claims, 8 Drawing Sheets

(56) References Cited

FOREIGN PATENT DOCUMENTS

| | | |
|---|---|---|
| JP | 2016-107762 | 6/2016 |
| JP | 2018-027732 | 2/2018 |
| JP | 2023172368 A | * 12/2023 |

OTHER PUBLICATIONS

Thomas Wachsmuth, Sep. 9, 2021, All information about retrofitting the Isofix system!, https://www.tuningblog.eu/en/tipps_tuev-dekra-u-co/isofix-system-367110/ (Year: 2021).*

Japanese Office Action for Japanese Patent Application No. 2021-176663 mailed Apr. 4, 2023.

* cited by examiner

INTERIOR MEMBER FOR VEHICLE

CROSS-REFERENCE TO RELATED APPLICATION

The present application claims priority based on Japanese Patent Application No. 2021-176663, filed Oct. 28, 2021, the content of which is incorporated herein by reference.

BACKGROUND OF THE INVENTION

Field of the Invention

The present invention relates to an interior member for a vehicle.

Description of Related Art

As a seat for a vehicle, for example, one in which an airbag is installed in a back pad of a seatback, the back pad is covered with a back cover, and a tag (display tag) is provided on a sewing line of the back cover broken by a deploying operation of the airbag is known. For example, vehicle information such as display of airbag installation or the like is displayed on the tag. A seat cover is detachably attached to the back cover. A slit configured to expose the tag to the outside of the seat cover is formed in the seat cover.

Accordingly, the tag can be exposed to the outside of the seat cover from the slit of the seat cover in a state in which the seat cover is attached to the back cover. Accordingly, it is possible to confirm vehicle information that the airbag is installed in the back pad of the seatback (for example, see Japanese Unexamined Patent Application, First Publication No. 2016-107762).

SUMMARY OF THE INVENTION

Here, the tag disclosed in Japanese Unexamined Patent Application, First Publication No. 2016-107762, is attached to the back cover of the seatback. That is, the tag that displays vehicle information expressing a name of the vehicle, display of airbag installation, or the like is not attached to, for example, a door trim of a side door (hereinafter, an interior member for a vehicle). For example, when the tag is attached to an interior member for a vehicle, it is conceivable to sandwich the tag between a lower trim and an upper trim that are divided into two parts.

However, in this case, for example, the tag may be disposed along a shape of the lower trim, and the disposed tag may face upward. For this reason, it is conceivable that the vehicle information of the tag is difficult for an occupant to see.

In addition, when the tag faces upward, the tag may protrude from the lower trim or the upper trim toward the vehicle interior, and it is necessary to devise improvements from the viewpoint of design (aesthetics).

An aspect of the present invention is directed to providing an interior member for a vehicle capable of making vehicle information displayed on a tag easier for an occupant to see and further improving design.

In order to accomplish the above-mentioned purposes, an interior member for a vehicle according to an aspect of the present invention employs the following configuration.

(1) An aspect of the present invention is an interior member for a vehicle (for example, an interior member (20) of an embodiment) configured by causing an upper trim (for example, an upper trim (33) of the embodiment) and a lower trim (for example, a lower trim (32) of the embodiment), which are vertically divided in two parts, to abut each other, wherein a concave section (for example, a concave section (42) of the embodiment) having a bottom surface portion (for example, a bottom portion (46) of the embodiment) that is planar and inclined downward on an inner side in a vehicle width direction is formed in at least a part (for example, an area (41b) near a rear end of a curved portion of the embodiment) of the lower trim, and a tag (for example, a display tag (34) of the embodiment) is clamped by the bottom surface portion of the concave section and the upper trim.

According to the aspect of the above-mentioned (1), the concave section is formed in the lower trim, and the bottom surface portion of the concave section is planar and inclined downward on the inner side in the vehicle width direction. Further, the tag is attached while being clamped by the bottom surface portion of the concave section and the upper trim. Accordingly, the tag can be attached with the same downward inclination angle as the bottom surface portion of the concave section. Accordingly, the vehicle information displayed on the upper surface of the tag can be easily seen by an occupant. While a name of the vehicle, display of airbag installation, or the like is exemplified as the vehicle information, the vehicle information is not limited thereto.

Further, when the tag is clamped by the bottom surface portion of the concave section and the upper trim, the tag can be disposed in the concave section while being accommodated therein. Accordingly, it is possible to prevent the tag from protruding from the lower trim or the upper trim toward the vehicle interior. Accordingly, design (aesthetics) of the interior member can be improved.

(2) In the aspect of the above-mentioned (1), the lower trim may have a skin member (for example, a skin material (52) of the embodiment) formed on a surface of the lower trim and on which the tag is sewn, and a sewing portion (for example, a sewing portion (58) of the embodiment) in which the tag is sewn on the skin member may be located on an outer side of a clamping portion (for example, a clamping portion (34e) of the embodiment) in a vehicle width direction in which the tag is clamped by the bottom surface portion of the concave section and the upper trim.

According to the aspect of the above-mentioned (2), the tag is sewn on the skin member to form the sewing portion. In addition, the clamping portion of the tag is clamped by the bottom surface portion of the concave section and the upper trim. Further, the sewing portion is located on the outer side of the clamping portion in the vehicle width direction. Accordingly, the sewing portion can be hidden by the upper trim or the like such that the sewing portion is not seen by an occupant. Accordingly, design of the tag (i.e., the interior member) can be further improved.

(3) In the aspect of the above-mentioned (2), the bottom surface portion may have a protrusion (for example, a protrusion (54b) of the embodiment) protruding outward in the vehicle width direction, the skin member may have a slit portion (for example, a slit portion (55c) of the embodiment) on an outer side of the sewing portion in the vehicle width direction, and the protrusion may be inserted into the slit portion.

According to the aspect of the above-mentioned (3), the protrusion protrudes outward from the bottom surface portion in the vehicle width direction. In addition, the slit portion is formed in the skin member, and the slit portion is formed on the outer side of the sewing portion in the vehicle width direction. Further, the protrusion is inserted into the slit portion. In this way, when the protrusion is inserted into the slit portion, the skin member can be positioned by the protrusion at a predetermined position.

In addition, when the skin member is positioned by the protrusion, the tag sewn on the skin member can be easily and reliably fixed at the predetermined position. Accordingly, design of the tag (i.e., the interior member) can be further improved.

According to the aspect of the present invention, it is possible to make the vehicle information displayed on the tag easier for an occupant to see and further improve design.

DESCRIPTION OF EMBODIMENTS

Figure 1:
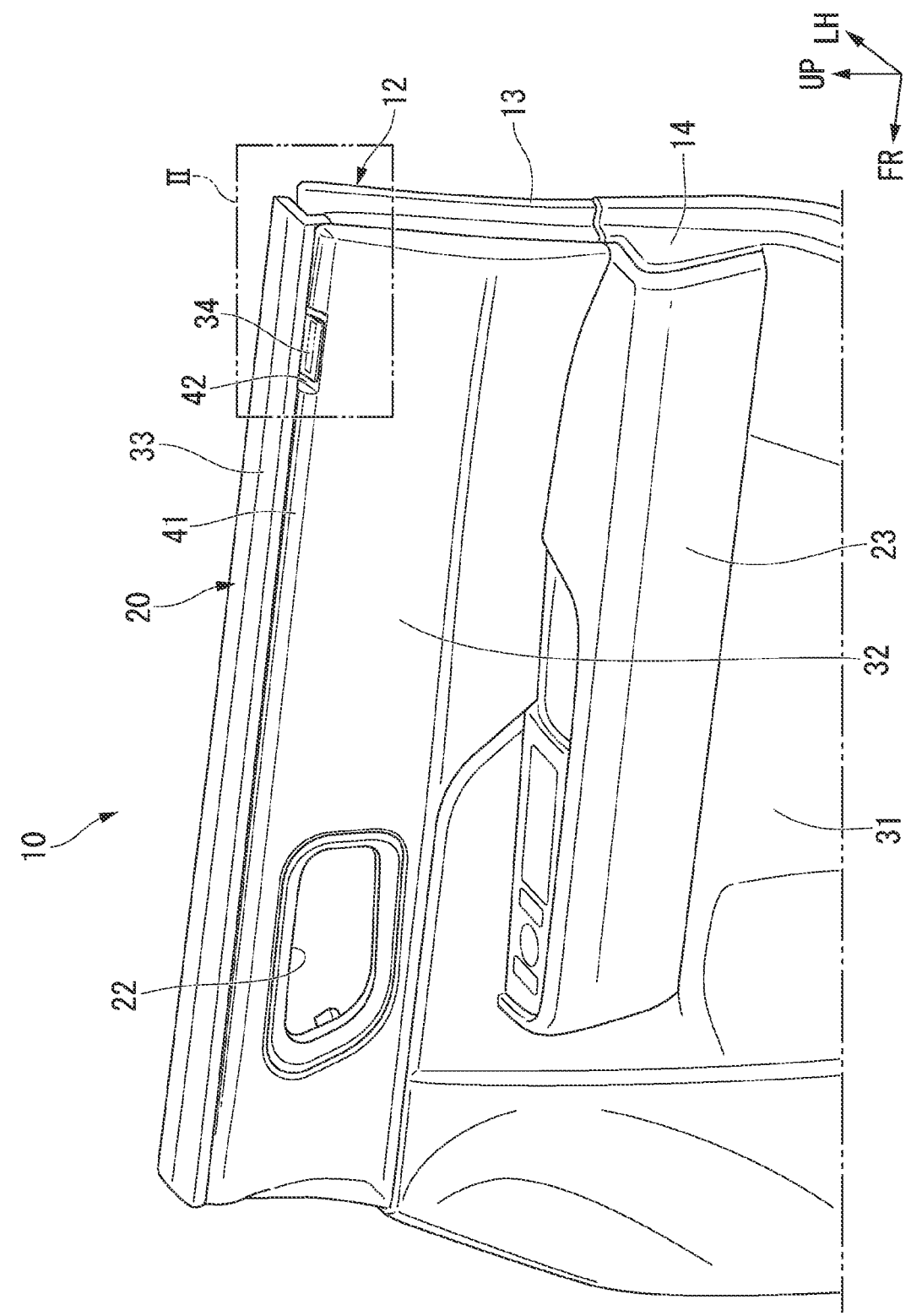
FIG. 1 is a perspective view of a front side door including an interior member for a vehicle of an embodiment according to the present invention.

Hereinafter, an interior member for a vehicle according to an embodiment of the present invention will be described with reference to the accompanying drawings. Further, in the drawings, an arrow FR indicates a forward direction of a vehicle, an arrow UP indicates an upward direction of the vehicle, and an arrow LH indicates a leftward direction of the vehicle. Further, while an example in which the interior member for a vehicle is applied to a front side door will be described as an example in the embodiment, the interior member for a vehicle may also be applied to another vehicle member.

As shown in FIG. 1, a front side door 10 includes, for example, a door main body 12, and an interior member 20 for a vehicle (door trim). Hereinafter, the front side door 10 is simply referred to as "the side door 10" and the interior member 20 for a vehicle is also simply referred to as "the interior member 20."

The door main body 12 includes an outer panel 13 and an inner panel 14. The outer panel 13 is disposed to face an outer side in a vehicle width direction (i.e., an outer side of the vehicle). The inner panel 14 is disposed to face the outer panel 13 on the inner side in the vehicle width direction (i.e., an inner side of the vehicle). The door main body 12 has a hollow structure constituted by the outer panel 13 and the inner panel 14.

<Interior Member for Vehicle>

The interior member 20 is attached to the door main body 12. The interior member 20 is attached to the door main body 12 to cover substantially the entire surface of the inner panel 14 on the side of the vehicle interior. That is, the interior member 20 is a decoration member that faces the vehicle interior. An attachment hole 22 of a door handle, an armrest portion 23, or the like is provided in the interior member 20.

The interior member 20 includes a trim main body 31, a lower trim 32, an upper trim 33, and a display tag (tag) 34.

The trim main body 31 is a decoration member configured to cover, for example, a region of the inner panel 14 from the armrest portion 23 to a lower end portion. The lower trim 32 is a decoration member configured to cover, for example, a region from the trim main body 31 to an upper end portion of the inner panel 14. The attachment hole 22 of the door handle is formed in the front section of the lower trim 32 on the front side of the vehicle body.

<Lower Trim>

Figure 2:
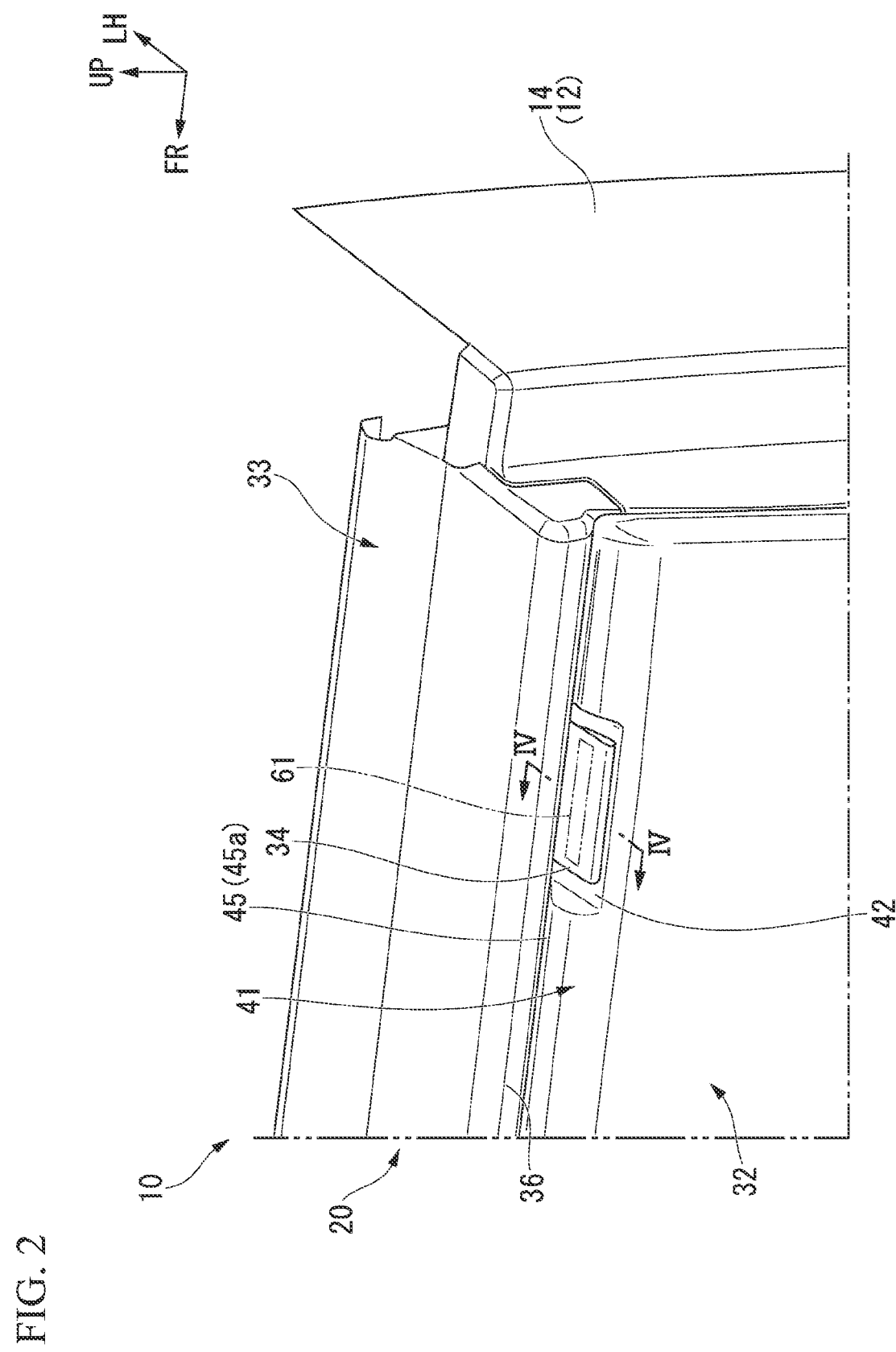
FIG. 2 is an enlarged perspective view of a portion II of FIG. 1.
Figure 3:
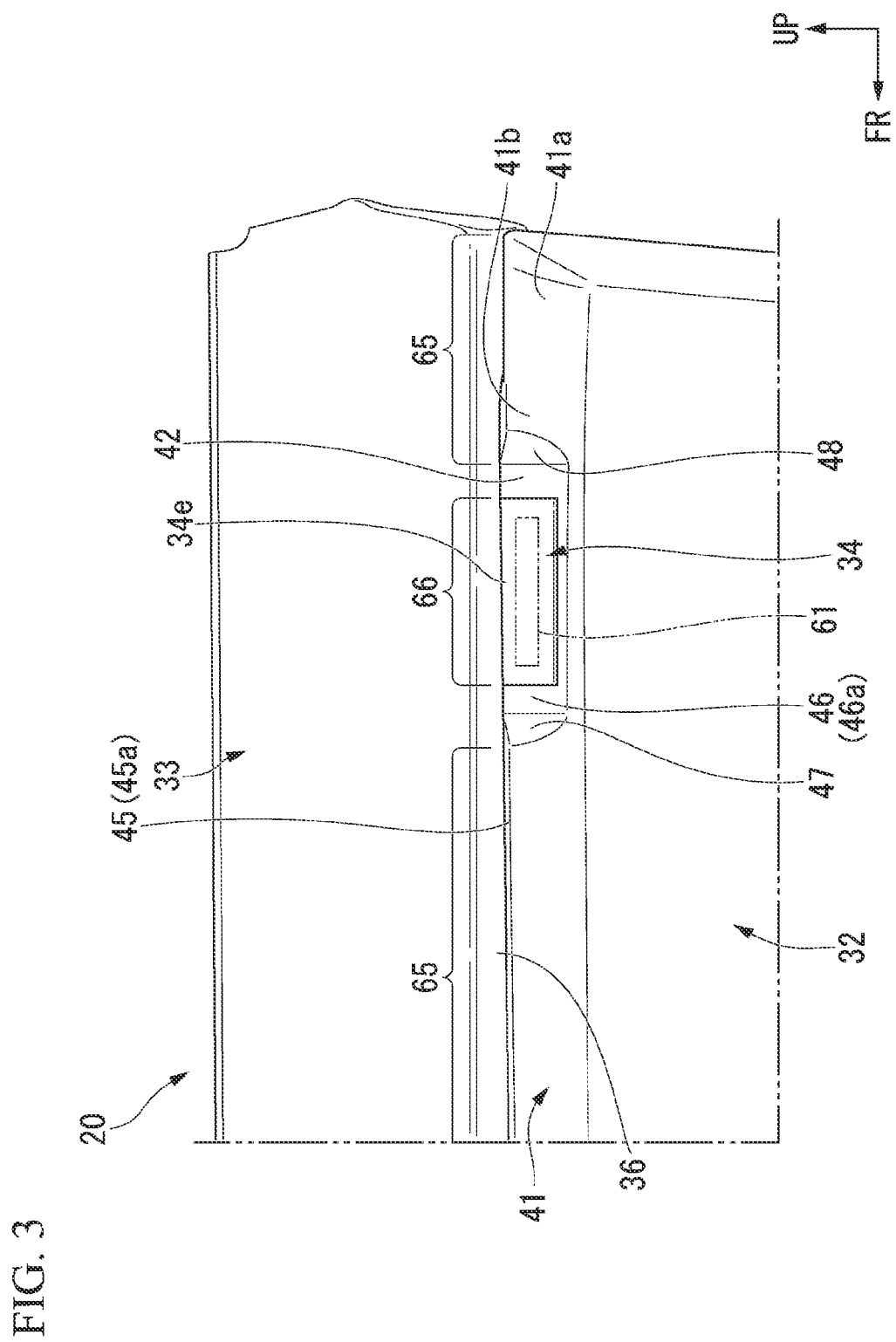
FIG. 3 is a plan view showing the interior member for a vehicle of the embodiment from diagonally above the vehicle interior.

As shown in FIG. 2 and FIG. 3, the lower trim 32 has a curved portion 41 and a concave section 42. The curved portion 41 is formed in a state in which the upper section of the lower trim 32 is fully curved outward to the upper trim 33 in the vehicle width direction. The curved portion 41 is formed in a substantially linear shape in a vehicle body forward/rearward direction. The curved portion 41 has an outer end portion 45 on an outer side in the vehicle width direction. The outer end portion 45 is formed from an upper side 45a to a lower side 45b (see FIG. 5) with a downward gradient outward in the vehicle width direction (see also FIG. 5). The concave section 42 is formed in the curved portion 41.

The concave section 42 has the concave section 42 formed in at least a part of the lower trim 32 (in the embodiment, an area 41b near a rear end 41a of the curved portion 41). In the embodiment, while the area 41b near the rear end 41a of the curved portion 41 is exemplified as at least a part of the lower trim 32, a position where the concave section 42 is provided may be arbitrarily selected.

Figure 4:
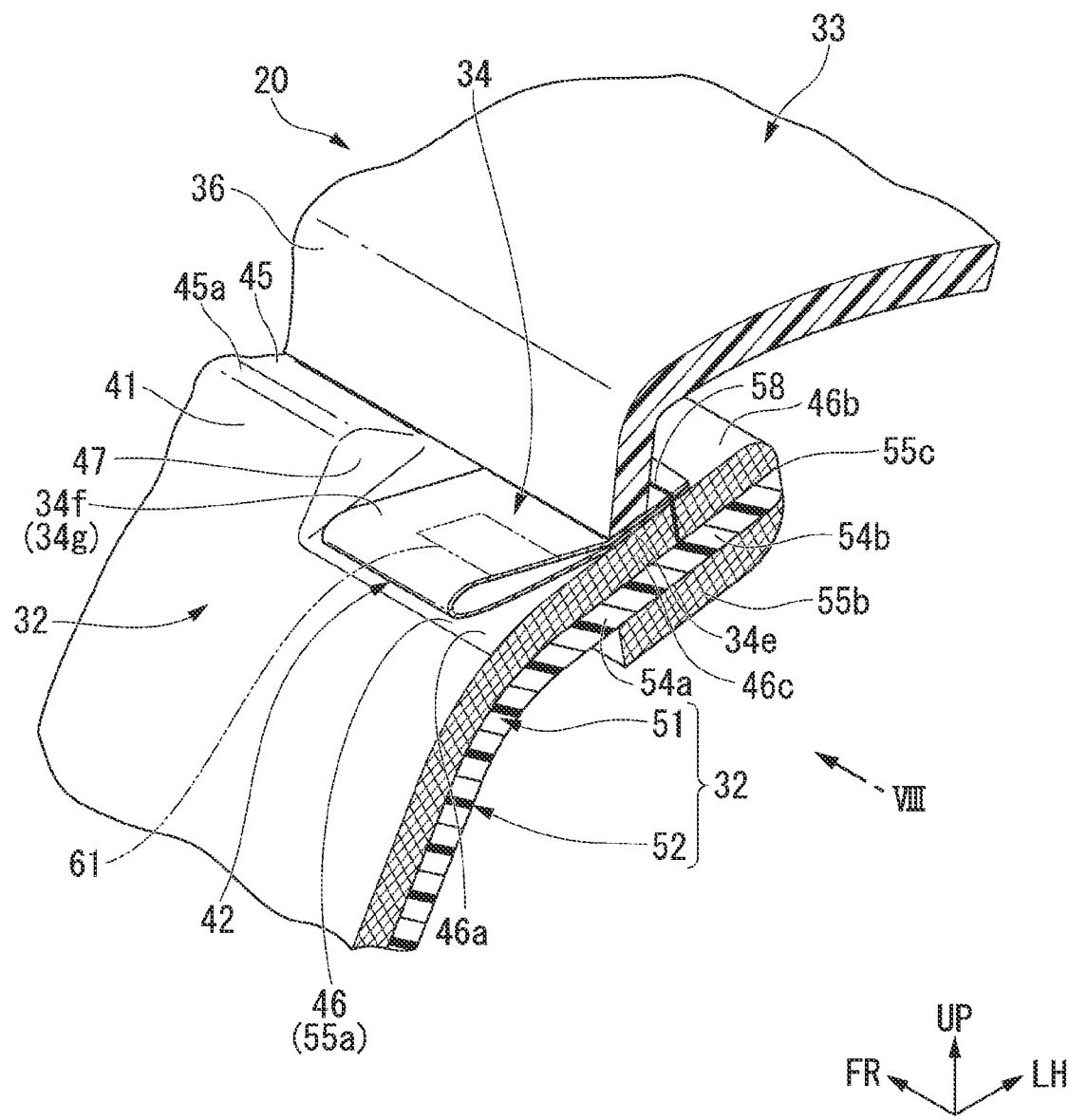
FIG. 4 is a perspective view showing a cross section along line IV-IV of FIG. 2.

As shown in FIG. 3 and FIG. 4, the concave section 42 has a bottom portion (bottom surface portion) 46, a front wall portion 47, and a rear wall portion 48. The bottom portion 46 has an inner bottom portion 46a and an outer bottom portion 46b. The inner bottom portion 46a is formed in a planar shape located below the curved portion 41 and inclined downward on an inner side in the vehicle width direction (i.e., an inner side of the vehicle). The outer bottom portion 46b is formed integrally with the inner bottom portion 46a, and extends from an outer end 46c of the inner bottom portion 46a in the vehicle width direction toward an outer side in the vehicle width direction with the same inclination as the inner bottom portion 46a. That is, the bottom portion 46 is formed in a planar shape inclined downward on an inner side in the vehicle width direction by the inner bottom portion 46a and the outer bottom portion 46b.

The front wall portion 47 is raised upward from a front end of the inner bottom portion 46a to the curved portion 41. The rear wall portion 48 is raised upward from a rear end of the inner bottom portion 46a to the curved portion 41.

Figure 5:
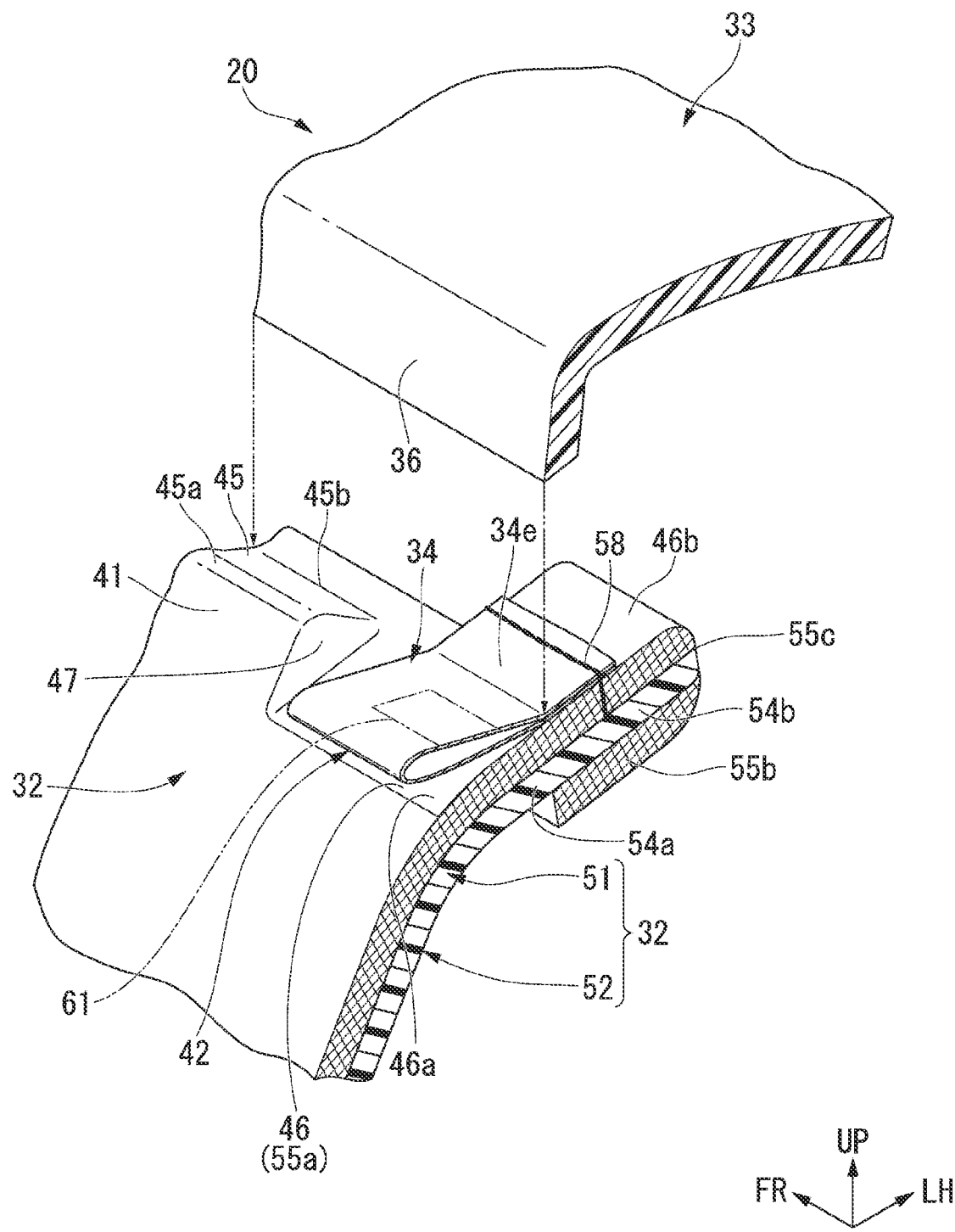
FIG. 5 is an exploded perspective view of an upper trim from the interior member for a vehicle of FIG. 4.
Figure 6:
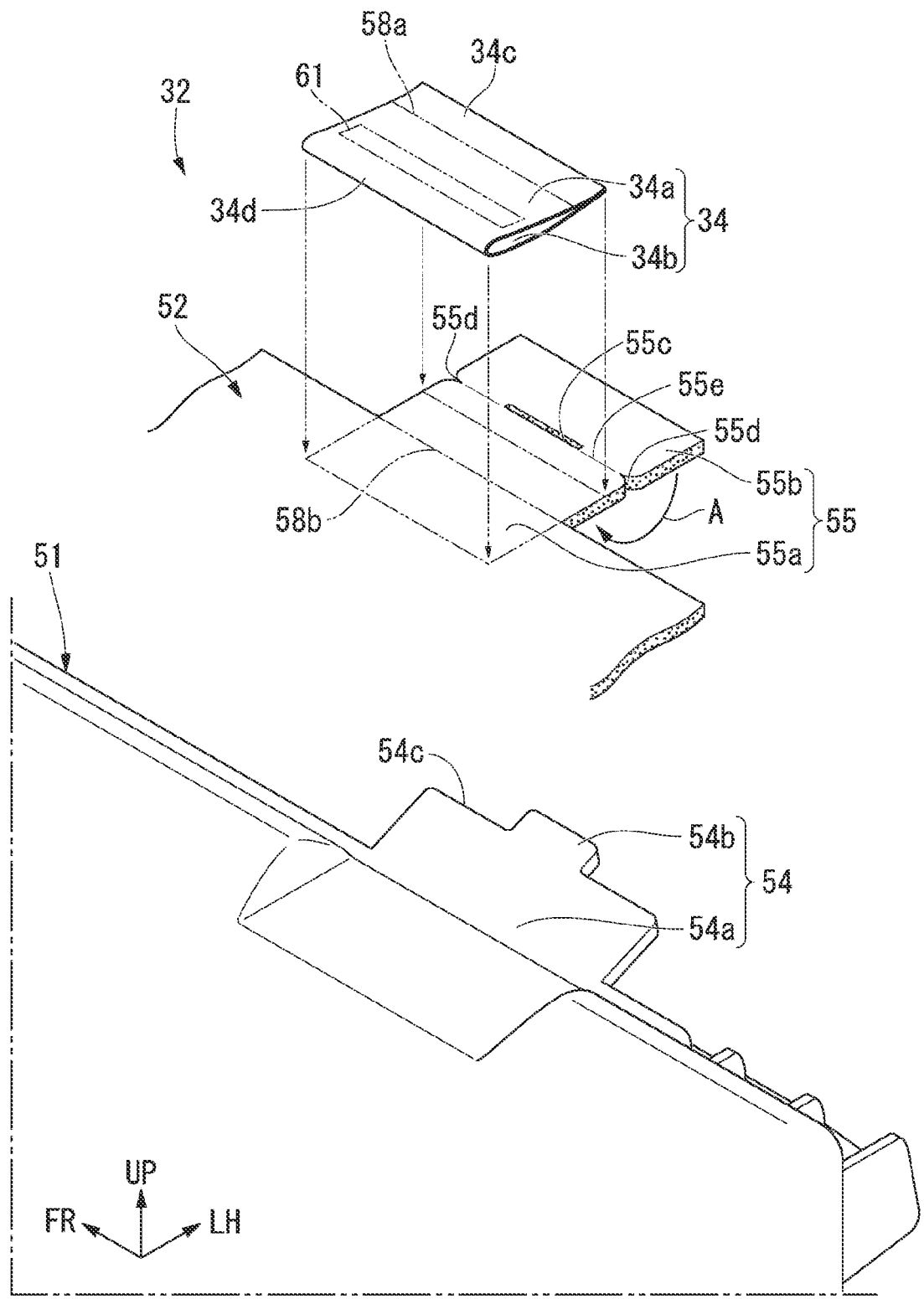
FIG. 6 is an exploded perspective view of a lower trim and a display tag that constitute the interior member for a vehicle of FIG. 4.

As shown in FIG. 5 and FIG. 6, the lower trim 32 includes, for example, a base member 51 and a skin material (skin member) 52. The lower trim 32 is configured by, for example, laminating the skin material 52 on a surface of the base member 51 facing the vehicle interior through adhesion or the like. The skin material 52 forms a surface of the lower trim 32 (i.e., a surface facing the vehicle interior) by being laminated on the base member 51.

Here, the bottom portion 46 of the concave section 42 in the lower trim 32 is configured by laminating a bottom portion 54 of the base member 51 and a bottom portion 55 of the skin material 52. Hereinafter, the bottom portion 54 of the base member 51 is also referred to as "the base member bottom portion 54." In addition, the bottom portion 55 of the skin material 52 is also referred to as "the skin bottom portion 55."

The base member bottom portion 54 has a base member bottom portion main body 54a and a protrusion 54b. The base member bottom portion main body 54a is formed in a planar shape inclined downward on an inner side in the vehicle width direction, like the bottom portion 46 of the concave section 42. The protrusion 54b is formed integrally with an outer end 54c of the base member bottom portion main body 54a in the vehicle width direction at a center in the vehicle body forward/rearward direction.

The protrusion 54b protrudes from the center of the outer end 54c to an outer side in the vehicle width direction (i.e., an outer side of the vehicle). The protrusion 54b is formed to be inclined downward on an inner side in the vehicle width direction, like the base member bottom portion main body Ma. The skin bottom portion 55 is laminated on the base member bottom portion 54.

The skin bottom portion 55 has a skin bottom portion main body 55a, a folding portion 55b, a slit portion 55c, and a pair of cutout portions 55d. The skin bottom portion main body 55a is laminated on the base member bottom portion main body 54a from the side of the vehicle interior. The skin bottom portion main body 55a is formed in a planar shape inclined downward along the base member bottom portion main body 54a on an inner side in the vehicle width direction.

A surface of the bottom portion 46 of the concave section 42 on the side of the vehicle interior is formed by the skin bottom portion main body 55a. The display tag 34 is sewn on the skin bottom portion main body 55a. Sewing of the display tag 34 will be described below in detail.

The folding portion 55b is formed integrally with an outer end 55e of the skin bottom portion main body 55a in the vehicle width direction. In a boundary (i.e., the outer end 55e) between the folding portion 55b and the skin bottom portion main body 55a, the slit portion 55c is formed at a center in the vehicle body forward/rearward direction. Hereinafter, the boundary between the folding portion 55b and the skin bottom portion main body 55a is also referred to as "a boundary 55e."

The slit portion 55c is formed in a linear shape in the vehicle body forward/rearward direction. The slit portion 55c is disposed on an outer side of a sewing portion 58, which will be described below, in the vehicle width direction (i.e., a position on the outer side of the vehicle). The slit portion 55c is fitted onto the protrusion 54b of the base member bottom portion 54. In other words, the protrusion 54b is inserted into the slit portion 55c.

In this way, when the protrusion 54b is inserted into the slit portion 55c, the skin bottom portion 55 of the skin material 52 can be positioned by the protrusion 54b at a predetermined position (i.e., the base member bottom portion main body 54a).

In addition, in the boundary 55e between the skin bottom portion main body 55a and the folding portion 55b, the pair of cutout portions (notch portions) 55d are formed in both end portions in the vehicle body forward/rearward direction. The pair of cutout portions 55d are formed in, for example, a V shape. Accordingly, for example, when the protrusion 54b is inserted into the slit portion 55c, the skin material 52 can be easily folded downward from the boundary 55e (i.e., the slit portion 55c) in a direction of an arrow A.

Accordingly, the protrusion 54b can be easily inserted into the slit portion 55c. The folding portion 55b that was folded is laminated on the base member bottom portion main body 54a from the outer side of the vehicle.

<Display Tag>

Figure 7:
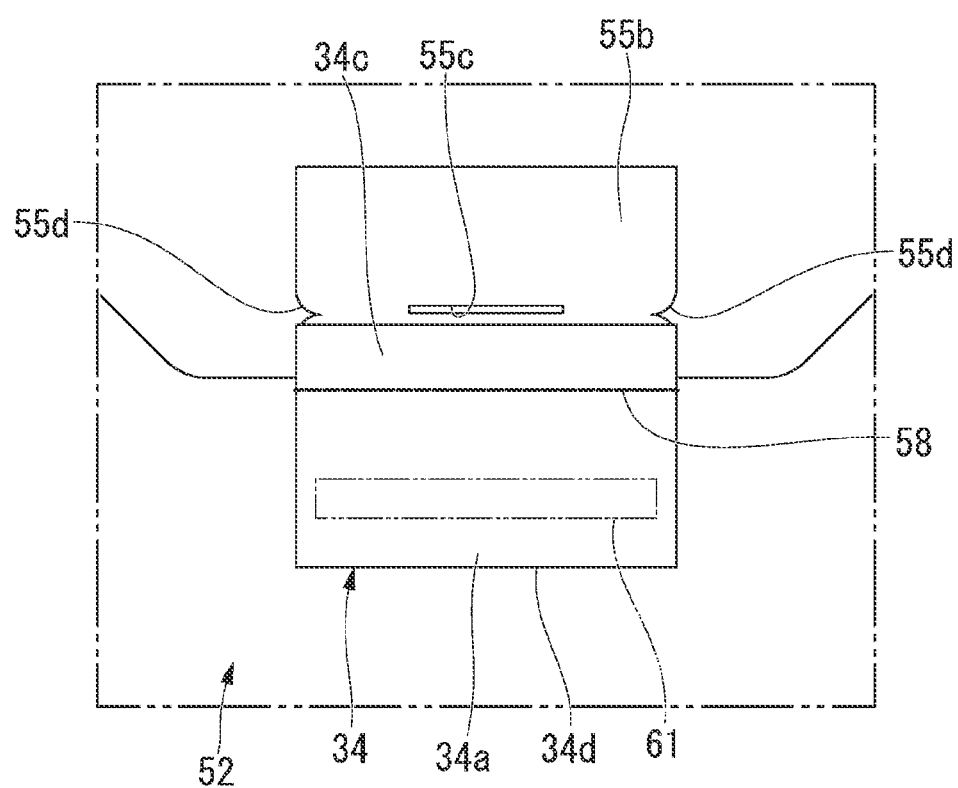
FIG. 7 is a plan view showing that a display tag is sewn to a skin material of the lower trim that constitutes the interior member for a vehicle of the embodiment.
Figure 8:
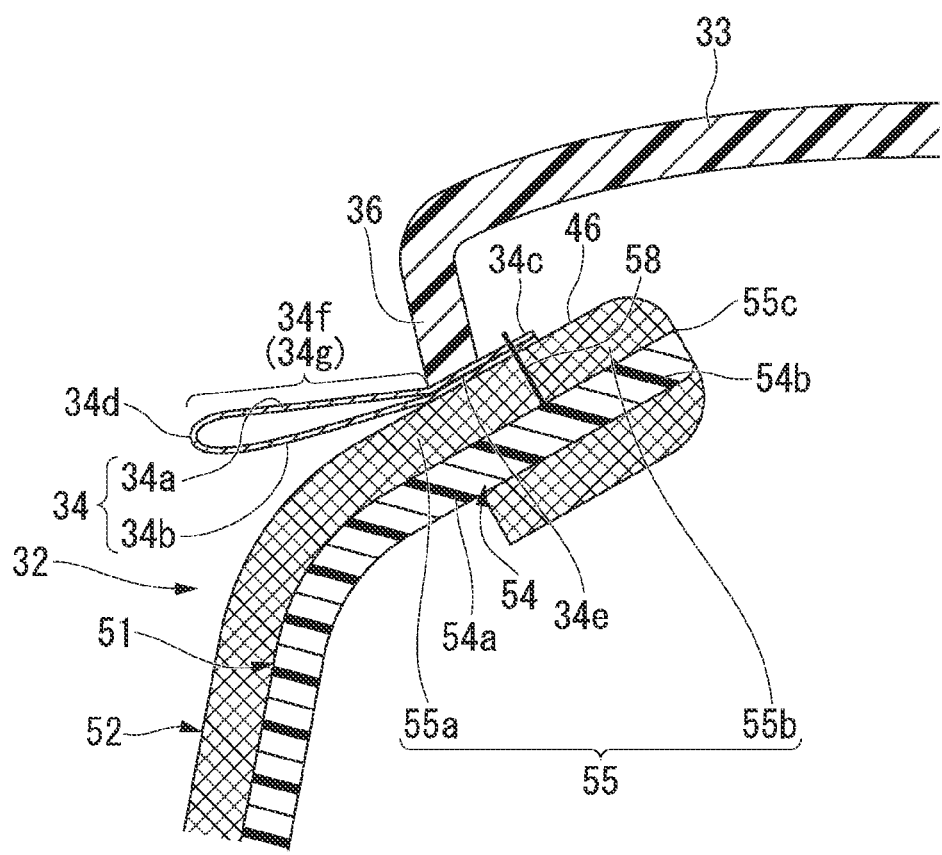
FIG. 8 is a cross-sectional view showing the interior member for a vehicle of FIG. 4 in a direction of an arrow VIII.
Figure 8:
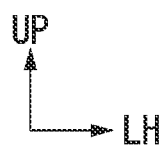

As shown in FIG. 6 to FIG. 8, the display tag 34 is sewn on the skin bottom portion main body 55a of the skin bottom portion 55. Specifically, the display tag 34 has an upper half portion 34a and a lower half portion 34b that are bent in the upward/downward direction at a center in the vehicle width direction. In a state in which the display tag 34 is folded, both of end portions of the upper half portion 34a and the lower half portion 34b overlap in the upward/downward direction. Hereinafter, both the end portions, which are overlapping, of the upper half portion 34a and the lower half portion 34b are also referred to as "both the end portions 34c."

Both of the end portions 34c, which are overlapping, of the display tag 34 are attached to the skin bottom portion main body 55a of the skin bottom portion 55 through sewing. That is, the lower trim 32 is formed by covering the base member 51 with the skin member on which the display tag 34 is sewn.

Here, the sewing portion 58 is formed by sewing both the end portions 34c of the display tag 34 on the skin bottom portion 55. The sewing portion 58 is an area in which a sewing place 58a of both the end portions 34c is sewn on a sewing place 58b of the skin bottom portion main body 55a. The sewing place 58a of both the end portions 34c and the sewing place 58b of the skin bottom portion main body 55a are shown by imaginary lines in FIG. 6.

The sewing portion 58 is located on an inner side of the slit portion 55c in the vehicle width direction. Further, the sewing portion 58 extends linearly along the slit portion 55c in the vehicle body forward/rearward direction.

The display tag 34 is disposed while being placed on the bottom portion 46 of the concave section 42 from above when both the end portions 34c are sewn on the skin bottom portion 55 at the sewing portion 58 (see also FIG. 5). In this state, the upper half portion 34a of the display tag 34 is disposed while being inclined downward along the bottom portion 46 of the concave section 42 from both the end portions 34c to a folded end 34d on the inner side in the vehicle width direction. For example, vehicle information 61 is displayed on the upper half portion 34a of the display tag 34. For example, while a name of the vehicle, display of airbag installation, or the like, is exemplified as the vehicle information 61, the vehicle information is not limited thereto.

<Upper Trim>

As shown in FIG. 3 to FIG. 5, the upper trim 33 abuts the lower trim 32 from above. That is, the lower trim 32 and the upper trim 33 are configured to be vertically divided in two parts while abutting each other in the upward/downward direction. Here, like the lower trim 32, the upper trim 33 is constituted by laminating the skin material on the base member. Further, in FIG. 4, FIG. 5 and FIG. 8, only the base member of the upper trim 33 is shown.

The upper trim 33 is disposed above the lower trim 32, and for example, forms a beltline of the side door 10. The upper trim 33 has an abutting portion 36 (see also FIG. 4 and FIG. 5) on the inner side in the vehicle width direction. The abutting portion 36 is formed in a state in which the area of the upper trim 33 on the inner side in the vehicle width direction is bent downward to the curved portion 41 (specifically, the outer end portion 45) of the lower trim 32. The abutting portion 36 is formed substantially linearly along the outer end portion 45 of the curved portion 41 in the vehicle body forward/rearward direction.

The abutting portion 36 abuts the outer end portion 45 of the curved portion 41 of the lower trim 32, a clamping portion 34e of the display tag 34, and the like, from above. Here, the display tag 34 is disposed while being placed on the bottom portion 46 of the concave section 42 formed on the lower trim 32 from above. Accordingly, when the abutting portion 36 abuts the clamping portion 34e of the display tag 34 from above, the clamping portion 34e is clamped by the bottom portion 46 and the abutting portion 36 in the upward/downward direction.

As shown in FIG. 8, the clamping portion 34e is located on the inner side of the sewing portion 58 in the vehicle width direction (i.e., on the side of the vehicle interior). In other words, the sewing portion 58 is located on the outer side of the clamping portion 34e in the vehicle width direction (i.e., on the outer side of the vehicle). The abutting portion 36 of the upper trim 33 abuts the clamping portion 34e from above. Accordingly, the sewing portion 58 can be hidden by the upper trim 33 such that the sewing portion 58 is not seen from the occupant in the vehicle interior.

In this state, the display tag 34 has a projection allowance portion 34f protruding from the clamping portion 34e toward the inner side in the vehicle width direction (i.e., toward the vehicle interior). The projection allowance portion 34f has a visual portion 34g. The visual portion 34g forms an upper surface of the projection allowance portion 34f (an upper surface of the display tag 34). That is, the visual portion 34g is an area of the upper half portion 34a of the display tag 34 protruding inward from the clamping portion 34e to the folded end 34d in the vehicle width direction.

Here, the bottom portion 46 is formed in a planar shape inclined downward on the inner side in the vehicle width direction. Accordingly, the visual portion 34g is disposed downward from the clamping portion 34e to the folded end 34d on the inner side in the vehicle width direction in the same inclination state as the bottom portion 46 in a state in which the clamping portion 34e is clamped by the bottom portion 46 and the abutting portion 36.

That is, the visual portion 34g is attached to the seat with a downward inclination (an inclination angle) toward the occupant who is sitting on the seat. The vehicle information 61 (see FIG. 6) such as a name of the vehicle, display of airbag installation, or the like, is displayed on the visual portion 34g.

As shown in FIG. 3 and FIG. 5, the concave section 42 is formed in the curved portion 41 of the lower trim 32, and the display tag 34 is disposed on the bottom portion 46 of the concave section 42. Accordingly, the display tag 34 is accommodated in the concave section 42. Accordingly, the clamping portion 34e of the display tag 34 is disposed at substantially the same height as that of the outer end portion 45 of the curved portion 41. That is, the clamping portion 34e and the outer end portion 45 are disposed on the same continuous plane extending in the vehicle body forward/rearward direction.

Here, the abutting portion 36 of the upper trim 33 is an area that abuts the clamping portion 34e and the outer end portion 45. Accordingly, the abutting portion 36 is formed in the same continuous planar shape in the vehicle body forward/rearward direction. In addition, the abutting portion 36 abuts the outer end portion 45 to form a first abutting portion 65. Further, the abutting portion 36 abuts the clamping portion 34e to form a second abutting portion 66. The first abutting portion 65 and the second abutting portion 66 are disposed to have a uniform height in the upward/downward direction in a state in which the interior member 20 is seen from a front surface on the side of the vehicle interior.

In addition, when the display tag 34 is placed on the concave section 42 of the lower trim 32, the concave section 42 can be hidden by the display tag 34.

In this way, design (aesthetics) of the interior member 20 can be improved by uniformizing the height of the first abutting portion 65 and the second abutting portion 66 and hiding the concave section 42 using the display tag 34.

As described above, according to the interior member 20 for a vehicle of the embodiment, as shown in FIG. 4 and FIG. 5, the concave section 42 is formed in the curved portion 41 of the lower trim 32, and the bottom portion 46 of the concave section 42 is planar and inclined downward on the inner side in the vehicle width direction. Further, the display tag 34 is clamped and attached by the bottom portion 46 of the concave section 42 and the abutting portion 36 of the upper trim 33. Accordingly, in a state in which the display tag 34 is attached to the bottom portion 46 and the abutting portion 36, the visual portion 34g (see also FIG. 8) of the display tag 34 can be attached to the bottom portion 46 with the same downward inclination angle.

That is, the visual portion 34g is attached to the seat with a downward inclination (inclination angle) toward the occupant who is sitting on the seat. Accordingly, the vehicle information 61 displayed on the visual portion 34g can be easily seen from, for example, the occupant who is sitting on the seat.

Further, the display tag 34 can be disposed while being accommodated in the concave section 42 by clipping the display tag 34 using the bottom portion 46 of the concave section 42 and the abutting portion 36 of the upper trim 33. Accordingly, for example, it is possible to prevent the display tag 34 from protruding from the lower trim 32 or the upper trim 33 toward the vehicle interior. Accordingly, design (aesthetics) of the interior member 20 can be improved.

In addition, as shown in FIG. 8, the sewing portion 58 is located on the outer side of the clamping portion 34e in the vehicle width direction. Accordingly, the sewing portion 58 can be hidden by the upper trim 33 such that the sewing portion 58 is not seen from the occupant. Accordingly, design of the display tag 34 (i.e., the interior member 20) can be further improved.

Further, the concave section 42 can be hidden by the display tag 34 by placing the display tag 34 on the concave section 42 of the lower trim 32. Accordingly, design (aesthetics) of the interior member 20 can be further improved.

As shown in FIG. 4 and FIG. 6, the skin material 52 can be positioned by the protrusion 54b at a predetermined position by inserting the protrusion 54b into the slit portion 55c. Accordingly, the display tag 34 sewn on the skin material 52 can be easily reliably fixed at the predetermined position. Accordingly, design of the interior member 20 can be further improved.

The technical scope of the present invention is not limited to the embodiment, and various modifications may be made without departing from the spirit of the present invention.

In addition, the components in the embodiment can be appropriately replaced with known components and the variants may be appropriately combined without departing from the spirit of the present invention.

What is claimed is:

1. An interior member for a vehicle configured by causing an upper trim and a lower trim, which are vertically divided in two parts, to abut each other, wherein the interior member includes a trim main body, the lower trim, the upper trim, and a tag, a concave section having a bottom surface portion that is planar and inclined downward on an inner side of the vehicle is formed in at least a part of the lower trim, and the tag is clamped by the bottom surface portion of the concave section and the upper trim.

2. The interior member for a vehicle according to claim 1, wherein the lower trim has a skin member formed on a surface of the lower trim and on which the tag is sewn, and a sewing portion in which the tag is sewn on the skin member is located on an outer side of a clamping portion of the vehicle in which the tag is clamped by the bottom surface portion of the concave section and the upper trim.

3. The interior member for a vehicle according to claim 2, wherein the bottom surface portion has a protrusion protruding outward of the vehicle, the skin member has a slit portion on an outer side of the sewing portion of the vehicle, and the protrusion is inserted into the slit portion.

\* \* \* \* \*